United States Patent Office 3,709,902
Patented Jan. 9, 1973

3,709,902
PHOSPHORYLATED 1,2,5-OXADIAZOLE DERIVATIVES
Clive B. C. Boyce, Herne Bay, Michael D. Barker, Maidstone, and Jack Wood, Sittingbourne, England, assignors to Shell Oil Company, New York, N.Y.
No Drawing. Filed Apr. 19, 1971, Ser. No. 135,390
Claims priority, application Great Britain, Apr. 22, 1970, 19,192/70
Int. Cl. C07d 85/56
U.S. Cl. 260—307 G                    5 Claims

ABSTRACT OF THE DISCLOSURE

This invention provides pesticidally active compounds of the general formula:

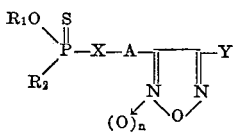

wherein the various symbols have the respective meanings described in the specification. A representative compound is 3-(dimethoxyphosphinothioylthiomethyl) - 4 - methyl-1,2,5-oxadiazole.

FIELD OF THE INVENTION

This invention relates to the use as pesticides of novel 1,2,5-oxadiazole derivatives phosphorylated at the 3-position of the ring.

DESCRIPTION OF THE PRIOR ART

Prosphorylated oxadiazole derivatives are disclosed in French Pat. 1,451,294, Belgian Pat. 730,484 and U.S. Pat. 3,269,896.

PREFERRED EMBODIMENTS OF THE INVENTION

The present invention provides phosphorylated 1,2,5-oxadiazole derivatives of the general formula:

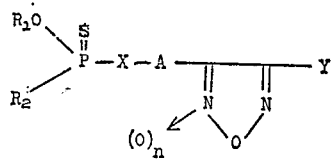

wherein $R_1$ represents alkyl of 1–6 carbon atoms, $R_2$ represents alkyl or alkoxy of 1–6 carbon atoms, X represents oxygen or sulfur, A represents a covalent bond or an alkylene group of 1–6 carbon atoms, Y represents alkyl of from 1–6 carbon atoms optionally substituted by acyl of 2–6 carbon atoms or by alkoxy of 1–6 carbon atoms and $n$ is 0 or 1. The alkylene group represented by A can be of straight-chain or of branched-chain configuration.

Preferred compounds are those wherein $R_1$ represents alkyl of 1–3 carbon atoms, particularly methyl or ethyl; $R_2$ represents alkoxy of 1–3 carbon atoms, particularly methoxy or ethoxy; A represents a covalent bond or an alkylene group of 1–3 carbon atoms, particularly methylene; and Y represents alkyl of 1–3 carbon atoms optionally substituted by alkoxycarbonyl of 2–4 carbon atoms, alkoxy of 1–3 carbon atoms, or by N,N-dialkylcarbamoyl of 3–6 carbon atoms, particularly methyl, ethyl, methoxycarbonylmethyl, methoxyethyl or (N,N-dimethylcarbamoyl) methyl.

The 1,2,5-oxadiazole derivatives of the invention wherein X represents a sulfur atom are obtained by reacting a compound of the formula:

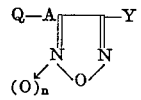

wherein Q represents a halogen, suitably chlorine or bromine, atom, or an alkylphenylsulfonyl group, particularly tosyl, with an alkali metal salt, suitably the sodium or potassium salt, of an organophosphorus acid of the formula:

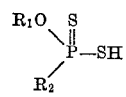

Those compounds of the invention wherein X represents an oxygen atom are prepared by reacting an alkali metal salt, suitably the sodium salt, of a hydroxy derivative of the formula:

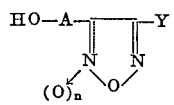

with a halophosphorus derivative of the formula:

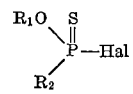

wherein Hal represents a halogen, preferably chlorine, atom. Both the above reactions are suitably carried out in an organic solvent such as a ketone, for example acetone or methyl isobutyl ketone.

As mentioned above the 1,2,5-oxadiazole derivatives of this invention exhibits pesticidal, in particular insecticidal properties. The invention includes therefore within its scope pesticidal compositions comprising a carrier or a surface-active agent or both a carrier and a surface-active agent together with, as active ingredient, at least one 1,2,5-oxadiazole derivative of the invention. Likewise, the invention includes also a method of combating insect pests at a locus which comprises applying to the locus a pesticidaly effective amount of a 1,2,5-oxadiazole derivative or composition of the invention.

The term "carrier" as used herein means a material, which may be inorganic or organic and of synthetic or natural origin with which the active compound is mixed or formulated to facilitate its application to the plant, seed, soil or other object to be treated, or its storage, transport or handling. The carrier may be a solid or fluid. Any of the material usually applied in formulating pesticides may be used as carrier.

Suitable solid carriers are natural and synthetic clays and silicates for example natural silicas such as diatomaceous earths; magnesium silicates, for example, talcs; magnesium aluminum silicates, for example, attapulgites and vermiculites; aluminum silicates, for example, kaolinites, montmorillonites and micas; calcium carbonates; calcium sulfate; synthetic hydrated silicon oxides and synthetic calcium or aluminum silicates; elements such as for example, carbon and sulfur; natural and synthetic resins such as for example, coumarone resins, polyvinyl chloride and styrene polymers and copolymers; solid polychlorophenols; bitumen; waxes such as for example, beeswax, paraffin wax and chlorinated mineral waxes; and solid fertilizers, for example superphosphates.

Examples of suitable fluid carriers are water, alcohols, such as for example, isopropanol, glycols; ketones such as for example, acetone, methyl ethyl ketone, methyl isobutyl ketone and cyclohexanone; ethers; aromatic hydrocarbons such as for example, benzene, toluene and xylene; petroleum fractions such as for example, kerosine, light mineral oils; chlorinated hydrocarbons, such as for example, carbon tetrachloride, perchlorethylene, trichloroethane, including liquefied normally vaporous gaseous compounds. Mixtures of different liquids are often suitable.

The surface-active agent may be an emulsifying agent or a dispersing agent or a wetting agent; it may be nonionic or ionic. Any of the surface-active agents usually applied in formulating pesticides may be used. Examples of suitable surface-active agents are the sodium or calcium salts of polyacrylic acids and lignin sulphonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; condensates of these with ethylene oxide and/or propylene oxide; condensation products of fatty alcohols or allyl phenols for example p-octylphenol or p-octylcresol, with ethylene oxide and/or propylene oxide; sulphates or sulphonates of these condensation products; alkali or alkaline earth metal salts, preferably sodium salts of sulphuric or sulphonic acid esters containing at least 10 carbon atoms in the molecule, for example, sodium lauryl sulphate, sodium secondary alkyl sulphates, sodium salts of sulphonated castor oil, and sodium alkylaryl sulphonates such as sodium dodecylbenzene sulphonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates and aerosols. Wettable powders are usually compounded to contain 25, 50 or 75% w. of toxicant and usually contain in addition to solid carrier, 3–10% w. of a dispersing agent and, where necessary, 0–10% w. of stabiliser(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% w. of toxicant. Granules are usually prepared to have a size between 10 and 100 BS mesh, and may be manufactured by agglomeration or impregnation techniques. Generally, granules will contain ½–25% w. toxicant and 0–10% w. of additives such as stabilisers, slow release modifiers and binding agents. Emulsifiable concentrates usually contain, in addition to the solvent and, when necessary, co-solvent, 10–50% w./v. toxicant, 2–20% w./v. emulsifiers and 0.20% k./v. of appropriate additives such as stabilisers, penetrants and corrosion inhibitors. Suspension concentrates are compounded so as to obtain a stable, non-sedimenting, flowable product and usually contain 10–75% w. toxicant, 0.5–15% w. of dispersing agents, 0.1–10% w. of suspending agents such as protective colloids and thixotropic agents, 0–10% w. of appropriate additives such as defoamers, corrosion inhibitors, stabilisers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

The compositions of the invention may contain other ingredients, for example, protective colloids such as gelatin, glue, casein, gums, cellulose ethers, and polyvinyl alcohol; thixotropic agents, e.g., bentonites, sodium polyphosphates; stabilisers such as ethylene diamine tetraacetic acid, urea, triphenyl phosphate; other pesticides or herbicides; and stickers, for example non-volatile oils.

Aqueous dispersion and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The invention is further illustrated in the following examples. In these examples, "parts" means parts by weight unless otherwise expressly indicated, with parts by weight having the same relationship to parts by volume as does the kilogram to the liter. In each example, the product was identified by elemental, infrared spectrum and/or nuclear magnetic resonance spectrum analyses.

EXAMPLE I 3-(dimethoxyphosphinothiolthiomethyl)-4-methyl-1,2,5-oxadiazole 3-bromomethyl-4-methyl-1,2,5-oxadiazole (3.54 parts) and the sodium salt of O,O-dimethyl phosphorodithionic acid (3.6 parts) in dry acetone (50 parts by volume) were stirred together for 16 hours at room temperature. The reaction mixture was filtered, the solvent removed under reduced pressure and the residual oil taken up in ether. The ethereal phase was washed with water and dried and the solvent removed under reduced pressure to yield an oil which was purified by heating at 80° C. in vacuo to yield the desired product as an oil ($n_D^{20}$ 1.5403).

EXAMPLE II 3-(dimethoxyphosphinothioyloxy)-4-(N,N-dimethylcarbamoylmethyl)-1,2,5-oxadiazole 3 - hydroxy - 4-(N,N-dimethylcarbamoylmethyl)-1,2,5-oxadiazole (1.7 parts) was dissolved in dry methyl isobutyl ketone (50 parts by volume). Sodium hydride (0.48 part, as 50% suspension in mineral oil) was added to the solution and the mixture was stirred until evolution of hydrogen had ceased. O,O-dimethylphosphorochloridothionate (1.8 parts) was added and the mixture was stirred at 80° C. for a further 3 hours. The mixture was then cooled, filtered and the solvent removed under reduced pressure. The residue was purified by chromatography on silica gel using 25% acetone in petroleum ether as eluant to yield the desired product as an oil.

EXAMPLE III 3-(dimethoxyphosphinothioylthiomethyl)-4-methyl-1,2,5-oxadiazole-2-oxide 3 - bromomethyl - 4 -methyl - 1,2,5-oxadiazole-2-oxide (1.9 parts) was added slowly to a solution of the sodium salt of O,O-dimethylphosphorodithionic acid (1.8 parts) in dry acetone (25 parts by volume). The mixture was stirred for 15 minutes at room temperature and then filtered. The filtrate was concentrated to yield an oil which was dissolved in ether. The etheral phase was washed with water and dried and the solvent removed under reduced pressure. The residual oil was purified by chromatography on silica gel using chloroform as eluant, followed by further chromatography on silica gel using benzene as eluant, to yield the desired product as an oil.

EXAMPLE IV–IX

Following the methods of Examples I–III, further compounds of this invention were prepared as listed in Table I.

TABLE I

| Example: | Compound |
|---|---|
| IV | 3-(dimethoxyphosphinothioyloxy)-4-ethyl-1,2,5-oxadiazole. |
| V | 3-(dimethoxyphosphinothioyloxy)-4-methoxycarbonylmethyl-1,2,5-oxadiazole. |
| VI | 3-(dimethoxyphosphinothioyloxy)-4-methyl-1,2,5-oxadiazole. |
| VII | 3-(dimethoxyphosphinothioyloxy)-4-(2-methoxyethyl)-1,2,5-oxadiazole. |
| VIII | 3-(diethoxyphosphinothioylthiomethyl)-4-methyl-1,2,5-oxadiazole. |
| IX | 3-(ethoxyethylphosphinothioylthiomethyl)-4-methyl-1,2,5-oxadiazole. |

EXAMPLES X–XVII
Insectidal activity

The insecticidal activity of the compounds of the invention was tested as follows:

TABLE II

| Example | Compound of Example No. | Insecticidal activity | | | | | | |
|---|---|---|---|---|---|---|---|---|
| | | M. domestica | A. aegypti | P. cochleariae | P. maculipennis | P. brassicae | M. viciae | T. urticae |
| X | I | B | B | A | A | C | C | A |
| XI | II | C | A | B | C | | A | A |
| XII | III | C | C | C | C | | A | A |
| XIII | IV | A | A | A | B | | A | A |
| XIV | V | C | C | A | A | C | A | A |
| XV | VI | A | A | A | A | C | B | A |
| XVI | VII | A | A | B | A | C | A | A |
| XVII | VIII | B | A | A | A | C | A | A |

(1) A 0.1% by weight solution in acetone of the compound to be tested was prepared, and taken up in a micrometer syringe. Two to three-day old adult female house flies (*Musca domestica*) were anaethetized with carbon dioxide, and 1 microliter drop of the test solution was brushed off on the ventral abdomen of each, 20 flies being treated. The treated flies were held for 24 hours in glass jars, each containing a little granulated sugar as food for the flies, and the percentage of dead and moribund individuals was then recorded.

(2) A quantity of 0.1 milliliter of a 0.1% by weight solution of the compound to be tested in acetone was mixed in a beaker with 100 milliliters of water. Twenty 5–6 day-old (4th instar) mosquito larvae (*Aedes aegypti*) were added and the beakers stored for 24 hours. The percentage of dead and moribund larvae was then recorded.

(3) The compounds were formulated as solutions or suspensions in water containing 20% by weight of acetone and 0.05% by weight of Triton X100 as wetting agent. The formulations contained 0.2% by weight of the compound to be tested. Turnip and broad bean plants, trimmed to one leaf each, were sprayed on the under surface of the leaf with the above formulation. Spraying was effected with a spraying machine delivering 450 liters per hectare, the plants passing under the spray on a moving belt. Ten 4th instar (8-day-old) diamond-back moth larvae (*Plutella maculipennis*) or ten adult 1–2 week-old mustard beetles (*Phaedon cochleariae*) were placed on the sprayed leaf of each turnip plant and ten apterous (6-day old) vetch aphids (*Megoura viciae*) were placed on the sprayed leaf of each broad bean plant. The plants were then enclosed in glass cylinders fitted at one end with a muslin cap. Mortality counts were made after 24 hours.

(4) In tests against glass house spider mites (*Tetranychus urticae*), leaf discs cut from French bean plants were sprayed in the manner described under 3. 1 hour after spraying, the discs were inoculated with 10 adult mites. Mortality counts were made 24 hours after inoculation.

(5) In tests against large white butterfly larvae (*Pieris brassicae*), leaf discs cut from cabbage leaves were sprayed in the manner described under 3. Ten 3rd instar (8–10 day old) larvae were placed on the discs within petri-dish pairs. Mortality counts were made 24 hours after inoculation.

The results of these tests are set out in Table II in which A denotes complete kill, B some kill and C no kill of the test insects.

We claim as our invention:

1. A 1,2,5-oxadiazole derivative having the general formula

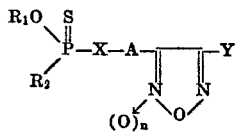

wherein $R_1$ represents alkyl of 1–6 carbon atoms; $R_2$ represents alkyl or alkoxy of 1–6 carbon atoms; X represents oxygen or sulphur; A represents a covalent bond or an alkylene group of 1–6 carbon atoms; Y represents alkyl of from 1–6 carbon atoms optionally substituted by alkoxycarbonyl of 2–4 carbon atoms, N,N-dialkylcarbamoyl of 3–6 carbon atoms, or alkoxy of 1–6 carbon atoms; and $n$ is 0 or 1.

2. An oxadiazole derivative as defined in claim 1 wherein $R_1$ represents alkyl of 1–3 carbon atoms; $R_2$ represents alkoxy of 1–3 carbon atoms; A represents a covalent bond or an alkylene group of 1–3 carbon atoms; and Y represents alkyl of 1–3 carbon atoms optionally substituted by alkoxycarbonyl of 2–4 carbon atoms, alkoxy of 1–3 carbon atoms, N-N-dialkylcarbamoyl of 3–6 carbon atoms.

3. An oxadiazole derivative as defined in claim 2 wherein $R_1$ represents methyl or ethyl; $R_2$ represents methoxy or ethoxy; A represents a covalent bond or methylene group; and Y represents methyl, ethyl, methoxycarbonylmethyl, methoxyethyl or (N,N-dimethylcarbamoyl(methyl.

4. An oxadiazole derivative as defined in claim 3 wherein $R_1$ represents methyl; $R_2$ represents methoxy; and Y represents methyl, ethyl, methoxycarbonylmethyl, N,N-dimethylcarbamoylmethyl.

5. An oxadiazole derivative as defined in claim 4 wherein $R_1$ is methyl, $R_2$ is methyl, X is oxygen, A is a covalent bond and Y is ethyl.

References Cited
UNITED STATES PATENTS 3,432,519    3/1969    Metivier et al. _____ 260—307

ALEX MAZEL, Primary Examiner

R. V. RUSH, Assistant Examiner

U.S. Cl. X.R.

424—272